350-274

7-8-75 XR 3,894,182

SR

United States Patent [19]

Yamamoto et al.

[11] 3,894,182

[45] July 8, 1975

[54] PICTURE REPRODUCING APPARATUS

[75] Inventors: Manabu Yamamoto, Odawara; Akira Hashimoto, Ohme; Hideyuki Horiuchi, Kokubunji, all of Japan

[73] Assignee: Hitachi, Ltd., Japan

[22] Filed: Aug. 27, 1973

[21] Appl. No.: 391,838

[30] Foreign Application Priority Data

Aug. 25, 1972 Japan .............................. 47-84547

[52] U.S. Cl. .................................. 178/7.6; 350/274

[51] Int. Cl. ............................................ H04n 1/04

[58] Field of Search .......... 178/7.6, DIG. 17; 350/7, 350/285, 266, 160 R, 160 P, 161, 274

[56] References Cited

UNITED STATES PATENTS

| | | | |
|---|---|---|---|
| 2,670,402 | 2/1954 | Marks | 178/DIG. 17 |
| 2,832,818 | 4/1958 | Rosenthal | 178/7.1 |
| 3,435,213 | 3/1969 | Colbow | 350/274 |
| 3,460,884 | 8/1969 | Heller | 350/160 R |
| 3,633,996 | 1/1972 | Lean | 350/285 |
| 3,657,707 | 4/1972 | McFarland | 350/285 |
| 3,719,780 | 3/1973 | Gazard | 178/7.6 |
| 3,762,791 | 10/1973 | Fournier | 178/7.6 |
| 3,799,644 | 3/1974 | Street | 178/7.6 |

*Primary Examiner*—Howard W. Britton
*Assistant Examiner*—Michael A. Masinick
*Attorney, Agent, or Firm*—Craig & Antonelli

[57] ABSTRACT

In a picture reproducing apparatus wherein the intensity of light is modulated in correspondence with predetermined video signals, and the modulated light is projected onto a screen to reproduce a picture, an optical path control device is arranged between the light modulating device and the screen, the optical path control device having a mechanism directing the modulated light onto the screen only during a reproducing period and preventing it from being directed onto the screen during a retrace period. The modulated light during the retrace period is detected to thereby adjust the light modulating device so as to allow it to always operate at the optimum operating point, whereby the picture on the screen will be reproduced in its best state at any time.

6 Claims, 8 Drawing Figures

PICTURE REPRODUCING APPARATUS

BACKGROUND OF THE INVENTION

1. Field of the Invention

The present invention relates to picture reproducing apparatus in which the intensity of a light beam generated by a laser or any other light source is modulated in correspondence with a video signal, a light receiving surface is scanned with the modulated light, and a picture corresponding to the video signal is formed on the light receiving surface.

2. Prior Art

FIG. 1 illustrates the general construction of a laser television projector, which is one of the picture reproducing apparatuses of the specified type having hitherto been known. In the figure, laser light sources 11R, 11B, and 11G radiate light rays of the primary colors of red, blue and green, respectively. Light modulators 12R, 12B, and 12G subject the light rays of the respective wavelengths to intensity modulation. Mirrors 13R, 13B, and 13G constitute a light beam combination system. Reference numeral 14 indicates a polygonal rotating mirror for horizontal deflection, while 15 indicates a polygonal rotating mirror for vertical deflection. Among signals received by a receiver 17 and produced after demodulation, the video signals corresponding to the red, green and blue components are applied to the respective light modulators via a video amplifier 18.

Three primary color beams thus modulated are combined by the combining mirrors. The combined beam is deflected in the horizontal and vertical directions by the rotating mirror light deflectors. In this way, a picture is reproduced on a light receiving surface 16. Synchronizing signals control a driving circuit 19 for the light deflector.

In the above, description has been made of a specific example in which the picture reproducing apparatus is used as the projector of television pictures. The picture reproducing apparatus can also be applied to a facsimile receiver or to the output display and printer of a computer by employing lightsensitive printing paper as the light receiving surface. In case of these uses, the mechanism for vertically or horizontally deflecting the light beam is not always necessary if the light receiving surface is made movable in the vertical or horizontal direction by a printing paper feeding mechanism.

The light deflector can also be constructed of a vibrating mirror or mirrors, rather than the pair of polygonal rotating mirrors as illustrated in FIG. 1. In contrast to the polygonal rotating mirror which is suitable for high speed scanning of a light beam, the single plane vibrating mirror is low in scanning speed. The vibrating mirror, however, is suitable for so-called random access deflection in which a light beam is deflected in arbitrary directions.

FIG. 2*a* shows a light deflector for use in a television display apparatus which is constructed by the combination of a polygonal rotating mirror 21 for line scanning and a vibrating plane mirror 22 for field scanning. FIG. 2*b* shows a random access light deflector which is constructed by the combination between two vibrating plane mirrors 23 and 24. It is also known that acousto-optic diffraction is applicable to the deflection of light.

In general, light modulators, particularly electro-optic light modulators, have had the tendency of giving rise to the "leakage of light" during the blanking period on account of imperfections therein. Although the light leakage can be minimized by appropriately selecting the operating point of the light modulator, namely, a bias voltage to be applied to the modulator crystal, it is difficult to fully prevent light leakage.

Besides, the bias voltage required to minimize the "light leakage," namely, the optimum operating point, drifts due to, for example, the temperature variation of the electro-optic crystal. This exerts an undesirable influence on the picture to be reproduced on the light receiving surface.

SUMMARY OF THE INVENTION

The present invention serves to eliminate the disadvantages in the picture reproducing apparatus, and has its object in providing a picture reproducing apparatus which can always operate light modulating means in the vicinity of its optimum operating point.

The present invention is constructed such that, in the known picture reproducing apparatus, means for controlling the optical path of the modulated light is arranged in the optical path of the modulated light emerging from a light modulator, the optical path control means operating in synchronism with video signals so that the modulated light may scan a light receiving surface during a period in which the picture is to be produced on the light receiving surface and that the modulated light may be brought into incidence on a light detector by the optical path control means during the fly-back period (a period of black level in which no picture is produced on the light receiving surface), the bias voltage of the video signals to be applied to the light modulator being adjustable so as to minimize the output signal level of the light detector.

A schematic block diagram of the picture reproducing apparatus of the present invention is shown in FIG. 3. In the figure, the apparatus includes a light beam generator 31 making use of a coherent or incoherent light source, a light modulator 32, an optical path control device 33, a light detector 34, an indicator 35, a feedback control system 36, a video signal source 37, and a light deflector 38. The output A represents the course of a light beam in the case of producing a picture on a light receiving surface 39, while the output B represents the course of the light beam during the fly back period. As has been already stated, in the case where the light receiving surface is movable, the light deflector is not necessarily required.

In the picture reproducing apparatus thus described, the light beam switched to the optical path B by the optical path control device 33 is incident on the light detector 34 during the fly-back period. The intensity of light leaking out of the light modulator 32 during the fly back period is detected by the light detector 34, and is indicated by the indicator 35. If necessary, the output signal of the light detector is applied through the feedback control system 36 to the video signal source 37. Thus, the bias voltage of the video signal to be applied to the light modulator 32, that is, the operating point of the light modulator is automatically adjusted so that the light modulator may be operated at the optimum operating point.

In the case where the feedback control system is not employed, it is required that an operator manually adjust the operating point of the light modulator as he is monitoring the indication of the indicator 35. The use of the feedback control system brings forth the advantage that the detection of the light leakage and the setting of the optimum operating point of the light modulator are automatically carried out.

In such cases where a vibrating mirror deflector or an acousto-optic light deflector, for example, is employed for the light deflector of the picture reproducing apparatus, and where the light receiving surface is moved, an unnecessary retrace line appears on the light receiving surface when, after depicting a scanning line equivalent to one picture element on the light receiving surface, the beam returns to the starting point of the succeeding scanning line. In contrast, in accordance with the picture reproducing apparatus of the present invention, no light beam is incident on the light receiving surface during the fly back or retrace period, as has been described above, so that the retrace line is blanked out. Moreover, operation can be further improved because of the means to automatically adjust the operating point of the light modulator.

As explained above, the present invention consists of arrangement of the optical path control device, which is operated in synchronism with the video signals and which effects a change-over between the courses of a light beam which are directed to the light receiving surface during the picture scanning period and to the light detector during the retrace period, between the light modulator and the light receiving surface, the operating point of the light modulator (namely, the black level signal) being adjusted automatically by the use of an output signal produced in the light detector.

In controlling the optical path control device 33 in synchronism with the video signals, the video signals may be applied to a detector which detects the presence or absence of a video signal, thereby distinguishing the video period from the retrace period, and the output of this video detector can then be used to control the optical path control device. In the alternative, control over operation of the optical path control device 33 could also be derived from the deflection signals which control the light deflector 38.

DESCRIPTION OF THE PREFERRED EMBODIMENTS

Figure 1:
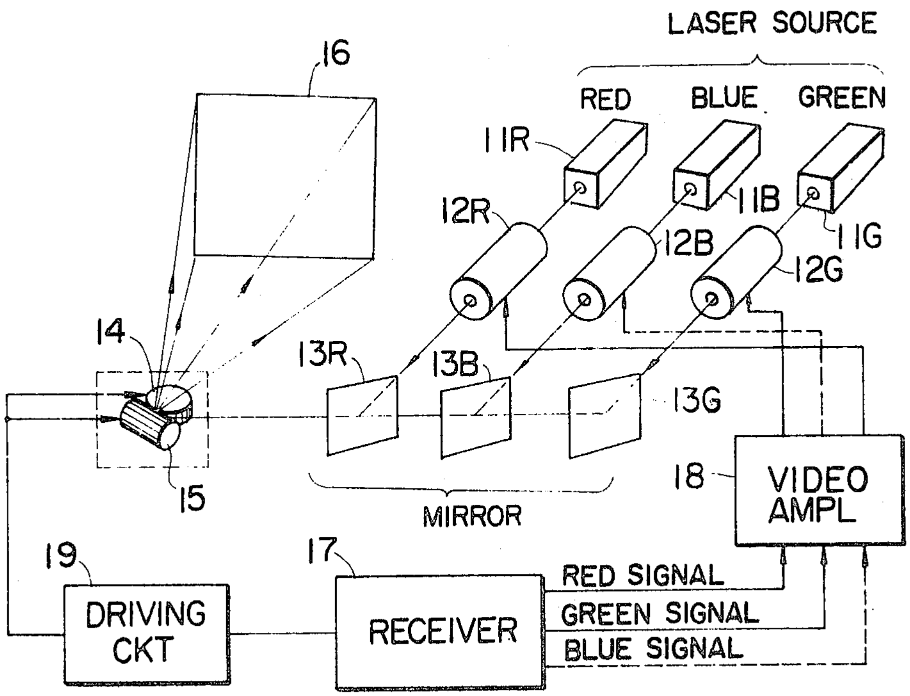
FIG. 1 PRIOR ART
FIG. 1 is a schematic diagram showing an example of a prior art construction of the picture reproducing apparatus which makes use of a light beam.
Figure 2A:
FIG. 2*a* and 2*b* are schematic views showing two examples of the construction of a light deflector.
Figure 2B:
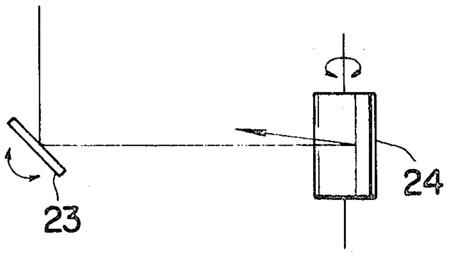
Figure 3:
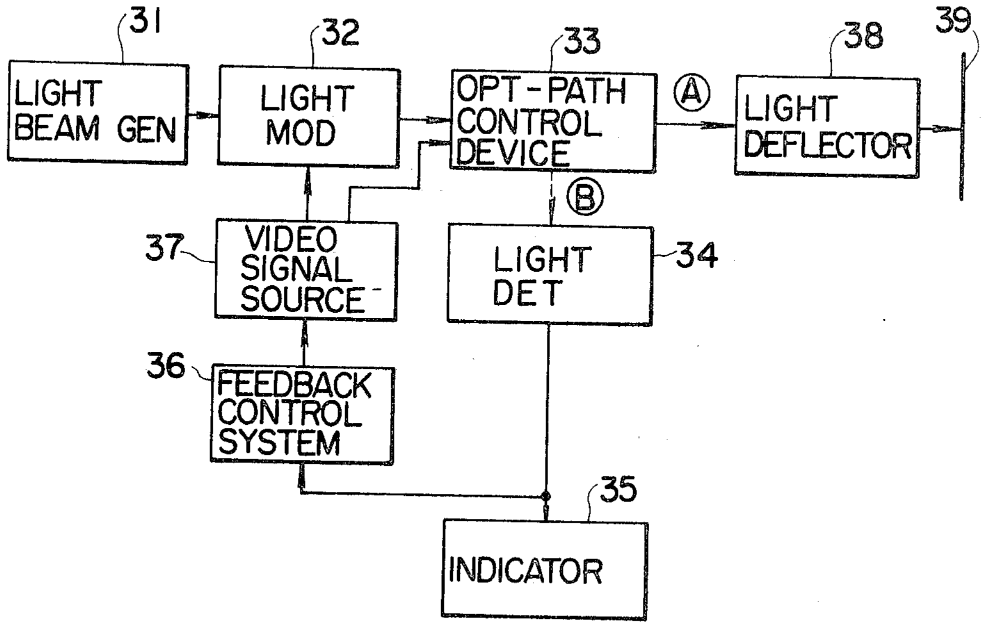
FIG. 3 is a schematic block diagram showing the construction of picture reproducing apparatus making use of a light beam which includes optical path control means, the apparatus being provided in accordance with the present invention.

The preferred embodiments of the present invention will be described hereunder with special stress laid on the optical path control device. The other constituent elements of the picture reproducing apparatus according to the present invention, namely, the light modulator, light detecting means, light deflector, feedback control system, indicator, light detector and video signal source may be conventional circuits of any type which will form a circuit similar or equivalent to that in the block diagram of FIG. 3. As in FIG. 3, the optical path during the picture scanning period is represented by A and the optical path during the blanking period is represented by B in the illustration of the following embodiments:

EMBODIMENT 1

Figure 4:
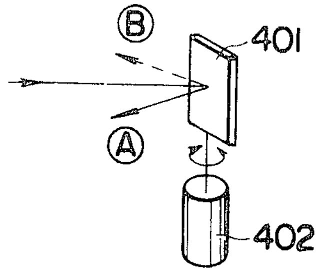
FIGS. 4 to 7 are schematic views of four embodiments of the optical path control device.

The optical path control device is constructed as a moving mirror. As shown in FIG. 4, the moving mirror 401 is driven by a driver 402, and changes its angle (direction) in synchronism with the video signals. The optical paths are therefore changed-over.

EMBODIMENT 2

Figure 5:
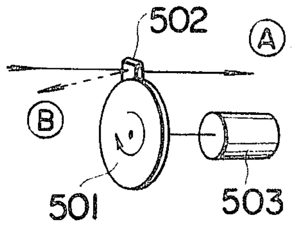

In this embodiment, the optical path control means employs a chopper utilizing a rotary disc. As is shown in FIG. 5, the chopper is in the form of a disc 501 having a lobe 502 and is arranged so that the lobe portion thereof (reflection mirror) interrupts the optical path of the modulated beam and directs it along path B during the blanking period only. With the disc 501 being driven in synchronism with the video signal by the driving source 503, the modulated beam will pass over the edge of the disc along the direction A during image reproduction and will be otherwise reflected along path B during the retrace period, so that the disc 501 acts as an optical path controlling element.

EMBODIMENT 3

Figure 6:
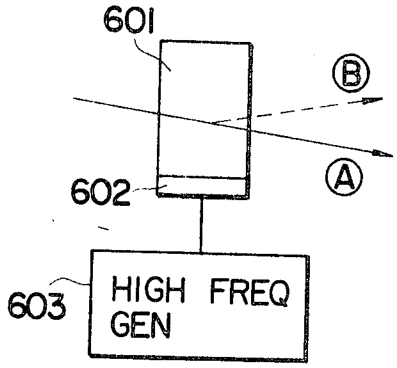

The optical path control device is constructed as an acousto-optical diffraction device. As shown in FIG. 6, an incident light beam is diffracted by acoustic waves existent in an acousto-optic medium 601, so that the optical path is switched. An acousto-optic transducer 602 is driven by a high-frequency generator 603 and operates only during the blanking period, whereas it ceases operation during the picture scanning period. Since no acoustic wave is produced in the acousto-optic medium during the non-operating period, the diffraction of light does not arise. Well-known acousto-optic media are glass, quartz, lead molybdate, $\alpha$-iodic acid, tellurium dioxide, water, etc.

EMBODIMENT 4

Figure 7:
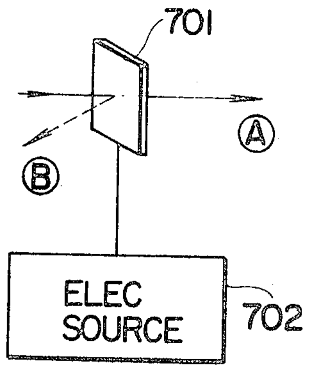

The optical path control device is constructed of an element which presents the electro-optic effect. It is well known that the modulation and deflection of light can be made by exploiting the electro-optic effect. With a multi-layer film comprising a thin layer to control the optical thickness of the multi-layer film, and layers of high refractive index and layers of low refractive index alternately laminated over and under the thin layer, the light transmission factor and reflection factor of the multi-layer film and be controlled by, for example, applying a voltage to the control layer. Therefore, such a multi-layer film can suitably be formed as the element of the optical path control device of the present invention. Referring to FIG. 7, a mirror of variable reflection factor 701 is nearly light-permeable when no voltage is applied thereto. In contrast, when it receives an appropriate voltage from a power source 702 during the blanking period only, it turns into a highly reflective mirror and switches the optical path of a light beam during that period only. With some structures of the multi-layer film, there can also be provided a mirror which is reflective when no voltage is applied and which is rendered light-permeable when a voltage is applied. Accordingly, whether the transmitted light or reflected light is used as the picture scanning beam A is optional in principle, and is to be determined from the viewpoint of design. Also in the other embodiments, the optical path A and the optical path B are generally exchangeable.

Among the various embodiments, the first and second ones relate to a mechanical moving mirror system. Although this system has a comparatively low beam switching speed, it has the advantage that the deflection angle does not depend on the wavelength of light. The third and fourth embodiments relate to systems exploiting the acousto-optic effect and electro-optic effect, respectively. These systems have a high beam switching speed, but they have wavelength-dependency in the switching characteristic. In consideration of these properties, an optical path switching means adequate for any specific use may be chosen.

The picture reproducing apparatus making use of a light beam in accordance with the techniques of the present invention has its main merits in the following two points. First, retrace lines can be perfectly erased, so that the picture quality is improved. Secondly, the light modulator can be operated at the optimum operating point with minimized light leakage in such a way that the intensity of light leaking out of the light modulator during the blanking period is detected.

The picture reproducing apparatus employing a light beam according to the present invention has wide uses in the field of information, the field of education, as a flight simulator, as a monitoring system, as a computer output display, as a facsimile device, and so forth.

What is claimed is:

1. In a picture reproducing apparatus including a light beam source, a light modulating device positioned to modulate the intensity of said light beam from said light beam source in correspondence with a predetermined video signal, and light receiving means for receiving the light beam modulated by said light modulating device, the improvement comprising optical path control means arranged between said light modulating device and said light receiving means for directing said modulated light beam along a first optical path to said light receiving means during a period for reproducing the video signal on said light receiving means and directing said modulated light beam along a second optical path away from said light receiving means during a retrace period, light detector means arranged on said second optical path of said modulated light beam for detecting the intensity of said modulated light beam in said second optical path, and input adjustment means for adjusting the operating point of said light modulating device in response to the output of said light detector means.

2. The picture reproducing apparatus according to claim 1, wherein said optical path control means is constructed as a movable mirror and means for changing the angle of orientation of said mirror in synchronism with said video signal.

3. The picture reproducing apparatus according to claim 1, wherein said optical path control means is constructed as a rotating chopper including a mirror and means for rotating said chopper to place said mirror in the path of said modulated light beam in correspondence with the video signal during said retrace period of said modulated beam.

4. The picture reproducing apparatus according to claim 1, wherein said optical path control means is constructed as an acousto-optic diffraction device.

5. The picture reproducing apparatus according to claim 1, wherein said optical path control means is constructed as an optical multi-layer film which includes a thin layer for controlling an optical thickness of said multi-layer film, layers of high refractive index and layers of low refractive index being alternately laminated over and under said thin layer, and voltage applying means for applying a control voltage to the control layer.

6. In a picture reproducing apparatus including a light beam source, a light modulating device positioned to modulate the intensity of said light beam from said light beam source in correspondence with a predetermined video signal, and light receiving means for receiving the light beam modulated by said light modulating device, the improvement comprising optical path control means arranged between said light modulating device and said light receiving means for directing said modulated light beam only along a first optical path to said light receiving means during a period for reproducing the video signal on said light receiving means and directing said modulated light beam only along a second optical path away from said light receiving means during a retrace period, light detector means arranged on said second optical path of said modulated light beam for detecting the intensity of said modulated light beam in said second optical path, and input adjustment means for adjusting the operating point of said light modulating device in response to the output of said light detector means.

* * * * *